United States Patent
Tsuchiya

(10) Patent No.: US 10,619,819 B2
(45) Date of Patent: Apr. 14, 2020

(54) VEHICULAR LAMP DEVICE

(71) Applicant: HONDA MOTOR CO., LTD., Minato-Ku, Tokyo (JP)

(72) Inventor: Yosuke Tsuchiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/089,131

(22) PCT Filed: Feb. 7, 2017

(86) PCT No.: PCT/JP2017/004456
§ 371 (c)(1),
(2) Date: Sep. 27, 2018

(87) PCT Pub. No.: WO2017/169141
PCT Pub. Date: Oct. 5, 2017

(65) Prior Publication Data
US 2019/0113202 A1   Apr. 18, 2019

(30) Foreign Application Priority Data

Mar. 31, 2016   (JP) .................................. 2016-071852

(51) Int. Cl.
*F21S 43/31* (2018.01)
*F21V 7/09* (2006.01)
(Continued)

(52) U.S. Cl.
CPC ............... *F21S 43/31* (2018.01); *F21S 41/36* (2018.01); *F21S 43/00* (2018.01); *F21S 43/14* (2018.01); *F21V 7/09* (2013.01); *F21S 41/141* (2018.01)

(58) Field of Classification Search
CPC .. F21S 43/31; F21S 41/36; F21S 43/14; F21S 41/141; F21S 43/00; F21S 43/30;
(Continued)

(56) References Cited

U.S. PATENT DOCUMENTS 6,422,726 B1 *   7/2002   Tatsukawa ............ F21S 41/164
                                              362/517
6,505,961 B2 *   1/2003   Natsume .................. F21V 7/04
                                              362/460
(Continued)

FOREIGN PATENT DOCUMENTS

| JP | H11-53904 A | 2/1999 |
| JP | 2001-202807 A | 7/2001 |
| JP | 2012-230843 A | 11/2012 |

OTHER PUBLICATIONS

PCT/ISA/210 from International Application PCT/JP2017/004456 with the English translation thereof.

*Primary Examiner* — Bao Q Truong
(74) *Attorney, Agent, or Firm* — Carrier Blackman & Associates, P.C.; Joseph P. Carrier; Jeffrey T. Gedeon

(57) ABSTRACT

A vehicular lamp device includes a horizontal rectangular lamp body and reflects irradiation light of light sources with a reflector unit for outward irradiation via an outer lens. Four reflector portions of the reflector unit have long side reflectors and short side reflectors. The long side reflectors are contiguously arranged in the long side direction at the positions toward the long sides of the lamp device. The short side reflectors are contiguously arranged in the short side direction at the positions toward the short sides of the lamp device. Light sources are each positioned toward the center of each reflector portion in front view of the lamp device. Border lines between the long side reflectors and short side reflectors are formed along inclined lines inclined to extend from near the light sources relative to the long side direction.

12 Claims, 14 Drawing Sheets

(51) Int. Cl.
   *F21S 43/00*     (2018.01)
   *F21S 41/36*     (2018.01)
   *F21S 43/14*     (2018.01)
   *F21S 41/141*    (2018.01)
(58) Field of Classification Search
   CPC .... F21S 43/40; F21V 7/09; F21V 7/00; F21V 7/0083; B60Q 1/04
   See application file for complete search history.

(56) References Cited

U.S. PATENT DOCUMENTS

2001/0009354 A1   7/2001  Natsume
2016/0219708 A1*  7/2016  Aiso ..................... H05K 3/105

\* cited by examiner

VEHICULAR LAMP DEVICE

TECHNICAL FIELD

The present invention relates to a vehicular lamp device and particularly relates to a vehicular lamp device that reflects irradiation light of a light source with multiple reflectors for outward irradiation.

BACKGROUND ART

Known vehicular lamp devices reflect irradiation light of a light source with multiple reflectors in the irradiation direction for outward irradiation via an outer lens.

Patent Literature 1 discloses a vehicular lamp device having a horizontal rectangular lamp body. This vehicular lamp device reflects irradiation light of LED sources disposed to the vertical center of the lamp body. This reflection uses horizontally long reflectors disposed to the upper and lower portions of the lamp body. This obtains light-emitting surfaces expanding in a belt shape in the vehicle width direction in the upper and lower portions of the lamp body.

PRIOR ART DOCUMENT

Patent Document
 Patent Document 1: JP 2012-230843 A

SUMMARY OF INVENTION

Problem to be Solved by Invention

However, the lamp device of Patent Literature 1 has light sources disposed toward the center of the lamp body in the vehicle width direction. The outer portions of the lamp body in the vehicle width direction become more apart from the light sources. Both side portions of the lamp body do not sufficiently emit light. That is, this disclosure does not contemplate that the portions along the left and right short sides of the horizontal rectangular lamp body, in addition to the portions along the upper and lower long sides thereof, emit light sufficiently.

For addressing the above issue of the above prior art, an object of the present invention is to provide a vehicular lamp device in which the portions along both long sides and short sides of a horizontal rectangular lamp body are capable of emitting light by using a small number of light sources.

Means for Solving Problems

To achieve the afore-mentioned purpose, the present invention has a first feature in a vehicular lamp device (40) that has a horizontal rectangular shaped outline having long sides and short sides and that reflects irradiation light (C) of light sources (51) with a reflector unit (43) for outward irradiation via an outer lens (41), wherein the reflector unit (43) includes at least one reflector portion (LU, RU, LL, RL), the reflector portion (LU, RU, LL, RL) includes: a plurality of long side reflectors (L) contiguously arranged in a long side direction at positions toward long sides of the lamp device (40); and a plurality of short side reflectors (S) contiguously arranged in a short side direction at positions toward short sides of the lamp device (40), one light source (51) is provided to a position toward a center of the lamp device (40) correspondingly to the one reflector portion (LU, RU, LL, RL) in front view of the lamp device (40), and a border line (67, 77, 87, 97) between the long side reflector (L) and the short side reflector (S) is formed along an inclined line (F) inclined to extend from near the light source (51) toward the long side.

The present invention has a second feature in that the vehicular lamp device (40) includes: the reflector unit (43) in which the four reflector portions (LU, RU, LL, RL) are disposed adjacent each other and integrated with each other; and the four light sources (51) respectively corresponding to the four reflector portions (LU, RU, LL, RL).

The present invention has a third feature in that the border line (67, 77, 87, 97) is produced by a level difference (D1) that depresses the short side reflector (S) by one step relative to the long side reflector (L).

The present invention has a fourth feature in that the long side reflectors (L) have focuses (P) that are formed by irradiation light (C) after reflection and that are disposed in a row on a horizontal line (D), the short side reflectors (S) have the focuses (P) formed by the irradiation light (C) after reflection and arranged in a row on a vertical line (E), and corner focuses (Pa) formed by vehicle width outermost portions (64, 74, 84, 94) of the long side reflectors (L) are disposed on extensions of the vertical lines (E).

The present invention has a fifth feature in comprising: a substrate (42) mounting the light sources (51); and an outer lens (41) that covers the reflector unit (43) securing the substrate (42), wherein the substrate (42) is a thin-plate member that is substantially in parallel to a plane portion of the outer lens (41) and that is secured to the reflector unit (43), and the light sources (51) are mounted to a surface of the substrate (42) to face the reflector unit (43) out of both surfaces of the substrate (42).

The present invention has a sixth feature in that the four reflector portions (LU, RU, LL, RL) include an upper left reflector portion (LU), an upper right reflector portion (RU), a lower left reflector portion (LL), and a lower right reflector portion (RL), a partition portion (45) between left and right irradiation ranges is integrally arranged upright from between the upper left reflector portion (LU) and the upper right reflector portion (RU) to between the lower left reflector portion (LL) and the lower right reflector portion (RL), and the substrate (42) is secured to a top of the partition portion (45).

The present invention has a seventh feature in that second light sources (50) are mounted to a surface of the substrate (42) to face the outer lens (41) out of both surfaces of the substrate (42).

The present invention has an eighth feature in that the vehicular lamp device (40) is a taillamp device disposed to a vehicle-body upper side of a license plate (31), and a license plate lens (44) that is transparent to irradiation light of a third light source (52) mounted to the substrate (42) is provided to a surface of the outer lens (41) to face a lower side of the vehicle body.

The present invention has a ninth feature in that the third light source (52) is mounted to a downward extending portion (42a) extending downward from the substrate (42) in front view of the lamp device (40), and a license plate reflector (48) is provided to reflect irradiation light of the third light sources (52) toward the license plate lens (44).

The present invention has a tenth feature in that the at least one third light source (52) includes a plurality of third light sources (52), and the downward extending portion (42a) of the substrate (42) covers the license plate reflector (48) integrally formed to the reflector unit (43).

Advantageous Effects of Invention

According to the first feature, the reflector unit (43) includes at least one reflector portion (LU, RU, LL, RL), the reflector portion (LU, RU, LL, RL) includes: a plurality of long side reflectors (L) contiguously arranged in a long side direction at positions toward long sides of the lamp device (40); and a plurality of short side reflectors (S) contiguously arranged in a short side direction at positions toward short sides of the lamp device (40), one light source (51) is provided to a position toward a center of the lamp device (40) correspondingly to the one reflector portion (LU, RU, LL, RL) in front view of the lamp device (40), and a border line (67, 77, 87, 97) between the long side reflector (L) and the short side reflector (S) is formed along an inclined line (F) inclined to extend from near the light source (51) toward the long side. The border lines are along the direction of the irradiation light. The irradiation light easily reaches the long side reflectors and short side reflectors adjoining the border lines. Not only the long side reflectors but also the short side reflectors can emit light efficiently. Thus, the light-emitting area along the short sides can be expanded by a single light source.

According to the second feature, the vehicular lamp device (40) includes: the reflector unit (43) in which the four reflector portions (LU, RU, LL, RL) are disposed adjacent each other and integrated with each other; and the four light sources (51) respectively corresponding to the four reflector portions (LU, RU, LL, RL). The perimeter along the long sides and short sides of the lamp is capable of emitting light by the minimum number of light sources.

According to the third feature, the border line (67, 77, 87, 97) is produced by a level difference (D1) that depresses the short side reflector (S) by one step relative to the long side reflector (L). The irradiation light easily reaches the short side reflectors and can be thus homogenized with the irradiation light from the long side reflectors.

According to the fourth feature, the long side reflectors (L) have focuses (P) that are formed by irradiation light (C) after reflection and that are disposed in a row on a horizontal line (D), the short side reflectors (S) have the focuses (P) formed by the irradiation light (C) after reflection and arranged in a row on a vertical line (E), and corner focuses (Pa) formed by vehicle width outermost portions (64, 74, 84, 94) of the long side reflectors (L) are disposed on extensions of the vertical lines (E). Multiple focuses that appear to have a large amount of light are contiguously disposed. Even four light sources can appear to correspond to the number of focuses. By using four light sources, a unique appearance having multiple light sources disposed in a substantially U shape is provided to the left and right portions of the lamp body.

According to the fifth feature, the lamp device comprises a substrate (42) mounting the light sources (51); and an outer lens (41) that covers the reflector unit (43) securing the substrate (42), wherein the substrate (42) is a thin-plate member that is substantially in parallel to a plane portion of the outer lens (41) and that is secured to the reflector unit (43), and the light sources (51) are mounted to a surface of the substrate (42) to face the reflector unit (43) out of both surfaces of the substrate (42). Irradiation light from each light source can irradiate toward the outer lens by one reflection. This can simplify the structure of the lamp device. Thickness and weight reduction of the lamp device is thus possible.

According to the sixth feature, the four reflector portions (LU, RU, LL, RL) include an upper left reflector portion (LU), an upper right reflector portion (RU), a lower left reflector portion (LL), and a lower right reflector portion (RL), a partition portion (45) between left and right irradiation ranges is integrally arranged upright from between the upper left reflector portion (LU) and the upper right reflector portion (RU) to between the lower left reflector portion (LL) and the lower right reflector portion (RL), and the substrate (42) is secured to a top of the partition portion (45). The partition portion that partitions the irradiation range also functions to support the substrate. Thus, a separate support member is unnecessary. The number of parts and the width and weight of the lamp device can be reduced.

According to the seventh feature, second light sources (50) are mounted to a surface of the substrate (42) to face the outer lens (41) out of both surfaces of the substrate (42). The second light sources are mounted to the top side of the substrate. The light-emitting surface different from the light-emitting surface formed by the reflector unit can be obtained. In detail, the substrate is disposed between the outer lens and reflector unit. When the light sources are illuminated, mainly the perimeter of the light body emits light, and simultaneously the substrate is shaded to appear dark. The second light sources are mounted to the dark portion. The mode of light emission only in the perimeter and the mode of light emission in both the perimeter and substrate portion can be obtained. Thus, the taillamp device having the taillamp illuminated in association with the headlamp and the brake lamp illuminated in response to operation of the brake can be obtained by a single substrate.

According to the eighth feature, the vehicular lamp device (40) is a taillamp device disposed to a vehicle-body upper side of a license plate (31), and a license plate lens (44) that is transparent to irradiation light of a third light source (52) mounted to the substrate (42) is provided to a surface of the outer lens (41) to face a lower side of the vehicle body. The license plate can be irradiated without providing a lamp body dedicated to irradiate the license plate.

According to the ninth feature, the third light source (52) is mounted to a downward extending portion (42a) extending downward from the substrate (42) in front view of the lamp device (40), and a license plate reflector (48) is provided to reflect irradiation light of the third light sources (52) toward the license plate lens (44). The license light that irradiates the license plate can be provided to the substantially rectangle lamp device in front view. The number of parts can be reduced.

According to the tenth feature, the at least one third light source (52) includes a plurality of third light sources (52), and the downward extending portion (42a) of the substrate (42) covers the license plate reflector (48) integrally formed to the reflector unit (43). While enhancing the irradiation light to the license plate, the reflection light from the license plate reflector can be prevented from leaking to the outer lens.

DESCRIPTION OF EMBODIMENTS

Figure 1:
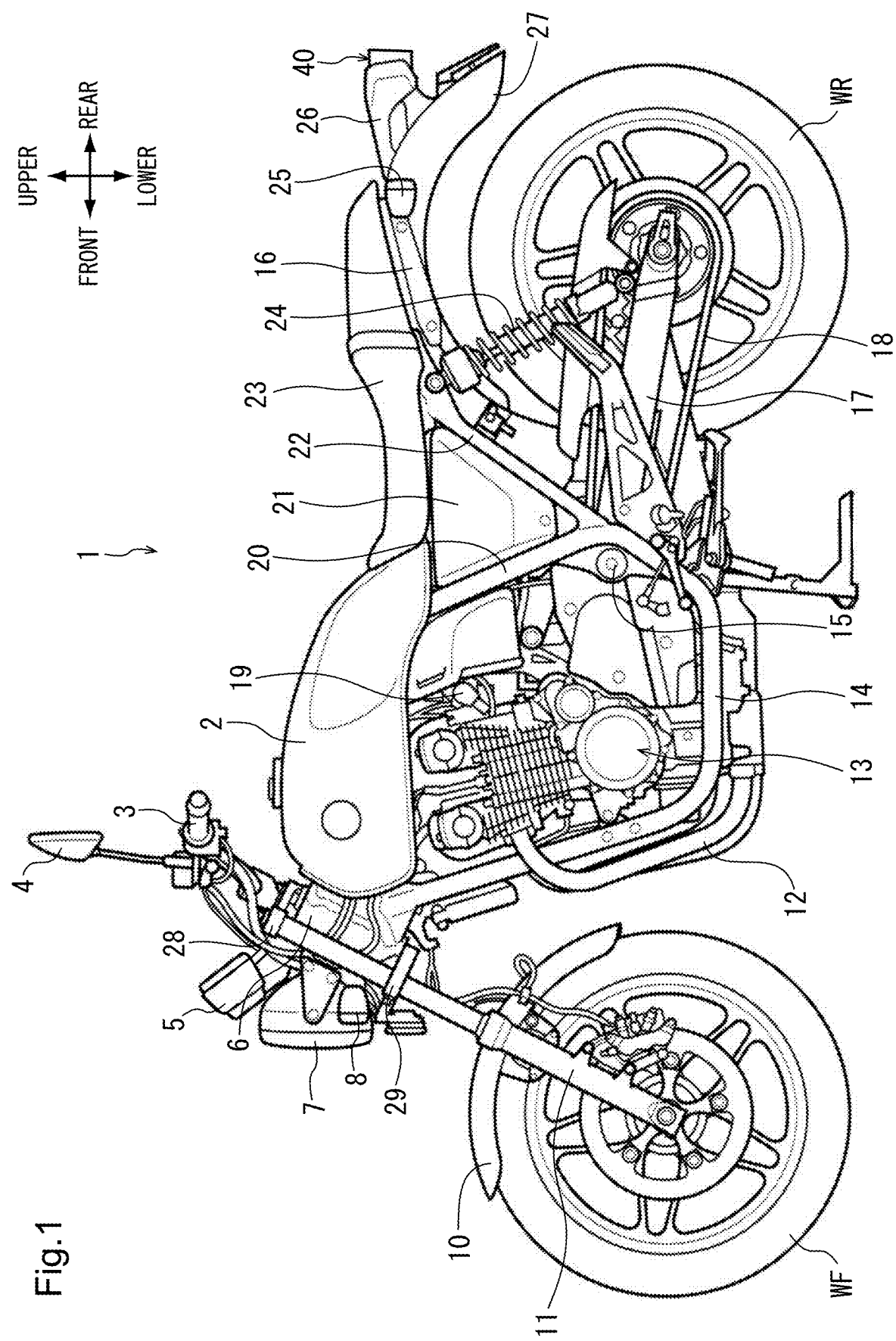
FIG. 1 is a left side view of a motorcycle that uses a vehicular lamp device.
Figure 2:
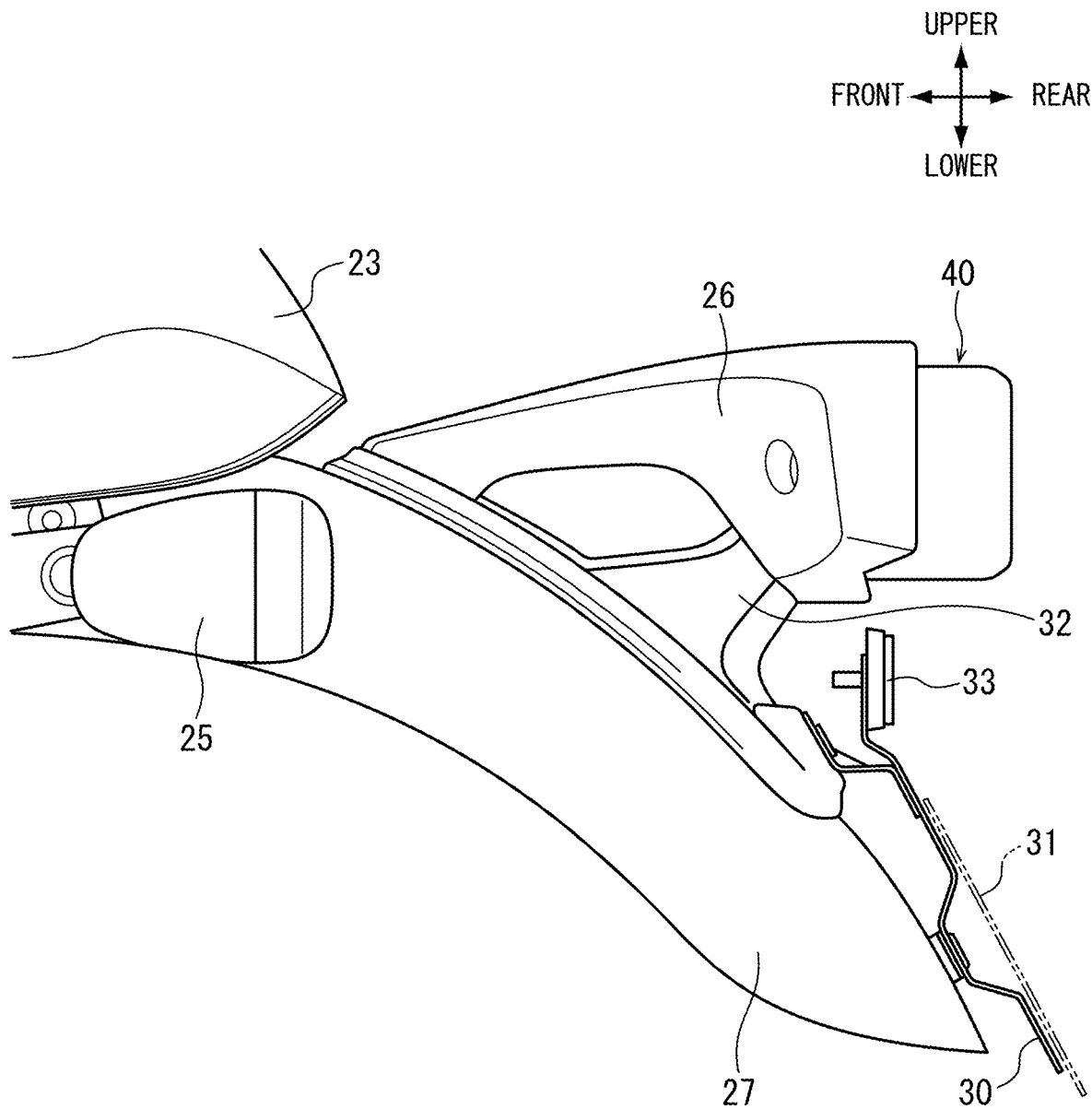
FIG. 2 is a partial enlarged view of FIG. 1.

In reference to the drawings, preferable embodiments of the present invention are described below in detail. FIG. 1 is a left side view of a motorcycle 1 that uses a vehicular taillamp device 40 of one embodiment of the present invention. FIG. 2 is a partial enlarged view of FIG. 1. The motorcycle 1 is a saddle-ride type vehicle having a fuel tank 2 disposed between a steering handlebar 3 that steers a front wheel WF and a seat 23 on which an occupant sits. Front forks 11 that rotatably journal the front wheel WF are pivotally journaled by a head pipe 6 provided to the front end of main frames 20. The pair of right and left front forks 11 is secured to a top bridge 28 and bottom bridge 29 that are respectively located above and below the head pipe 6. Stem shafts (unshown) secured to the top bridge 28 and bottom bridge 29 are pivotally journaled by the head pipe 6 at the center in the vehicle width direction to steer the front wheel WF.

The steering handlebar 3 that attaches a rearview mirror 4 thereto is secured to the upper surface of the top bridge 28. A meter device 5 supported by the front forks 11, a headlight 7, and a front blinker device 8 are disposed frontward of the head pipe 6. A front fender 10 that covers the upper portion of the front wheel WF is secured to the front forks 11.

A pivot 15 is provided to the rear lower portion of the pair of left and right main frames 20. The pivot 15 pivotally journals the front end of a swing arm 17. The swing arm 17 rotatably supports a rear wheel WR. An intake system 19 and an exhaust pipe 12 are attached to an engine 13 supported between the main frames 20 and an under frame 14. The driving force of the engine 13 is transmitted to the rear wheel WR via a drive chain 18.

A rear frame 22 extending rearward and upward is connected to the main frames 20 behind the pivot 15. The rear portion of the swing arm 17 is hung by the rear frame 22 by use of a pair of right and left rear shock absorbers 24. A pair of right and left grab bars 16 is provided below the rear portion of the seat 23. A rear blinker device 25 is disposed to the rear end portions of the grab bars 16. A rear fender 27 is secured behind the backside blinker device 25. A taillamp device 40 as a lamp device of the present invention is attached to a rear fender 27 via a supporting portion 26.

In reference to FIG. 2, the bottom of the supporting portion 26 of the taillamp device 40 is supported by a bottom supporting portion 32. A license plate stay 30 that supports a license plate 31 and a reflector 33 is attached across the bottom supporting portion 32 and rear fender 27. The taillamp device 40 is a lamp device in which a taillamp, a brake lamp, and a license light are integrated with each other. The taillamp is illuminated in response to lighting of the headlight 7. The brake lamp is illuminated in response to operation of a brake device. The license light illuminates the license plate 31 from above.

Figure 3:
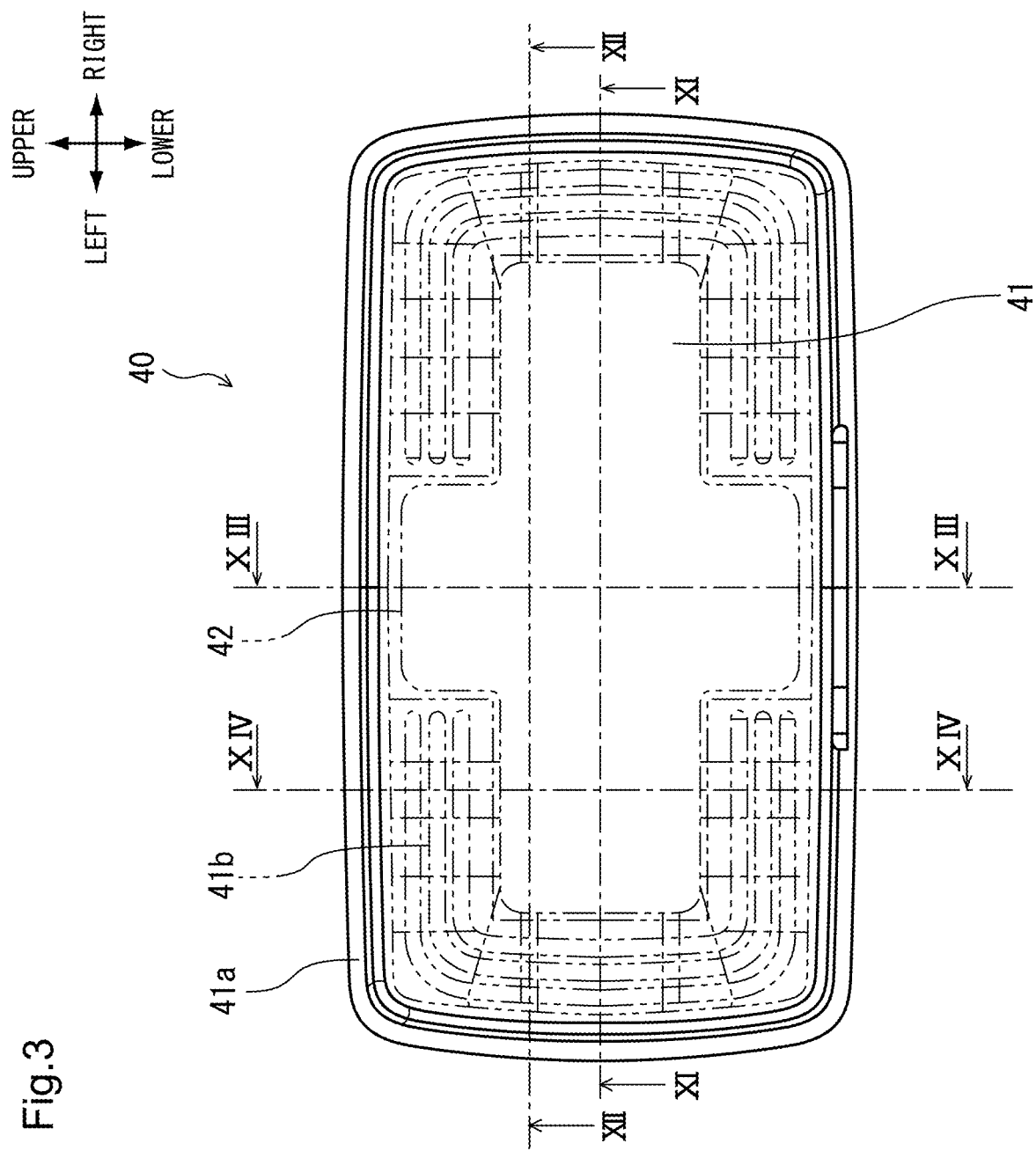
FIG. 3 is a front view of the taillamp device.
Figure 4:
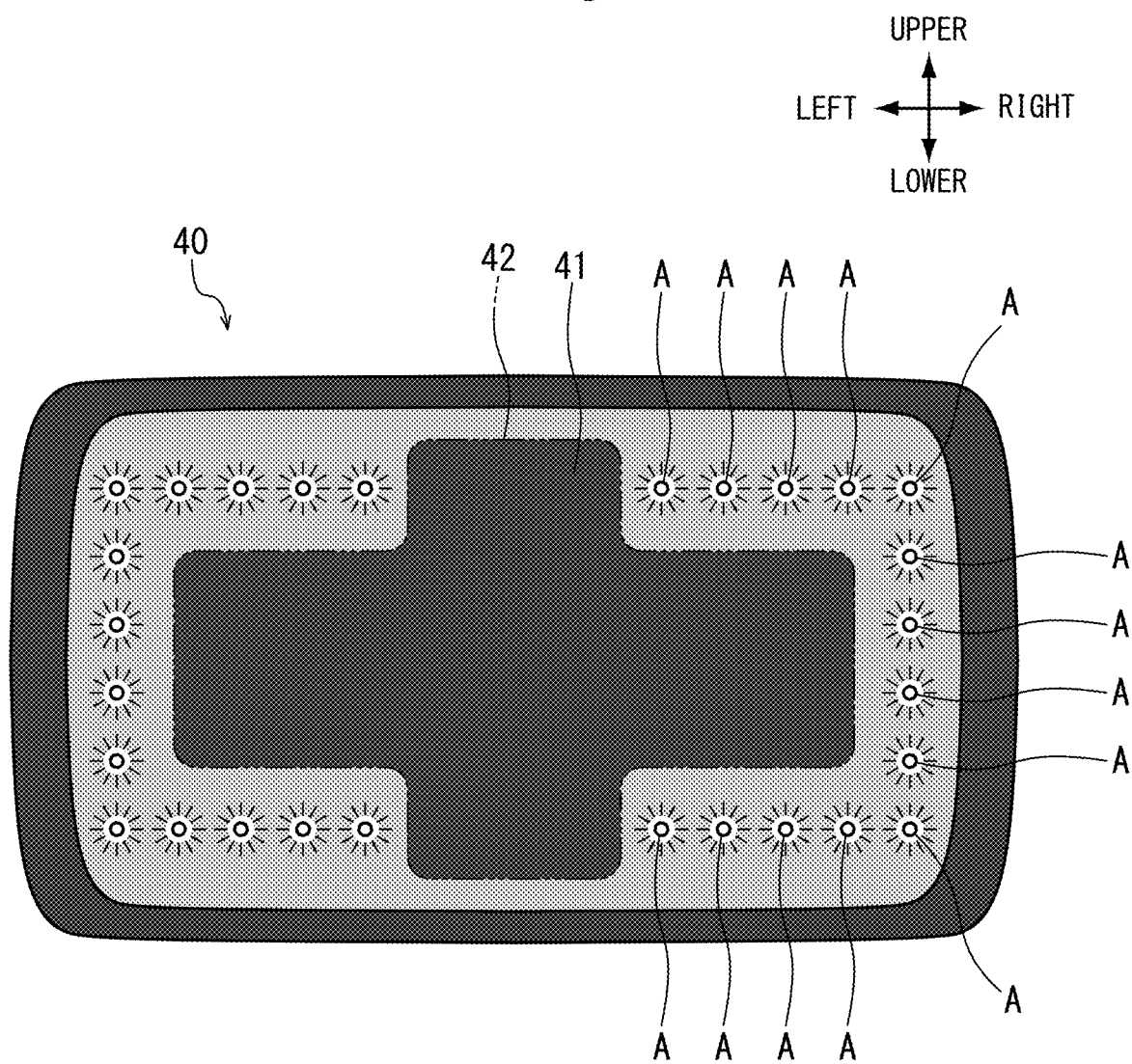
FIG. 4 is a front view of the taillamp device in the state where the taillamp is illuminated.
Figure 5:
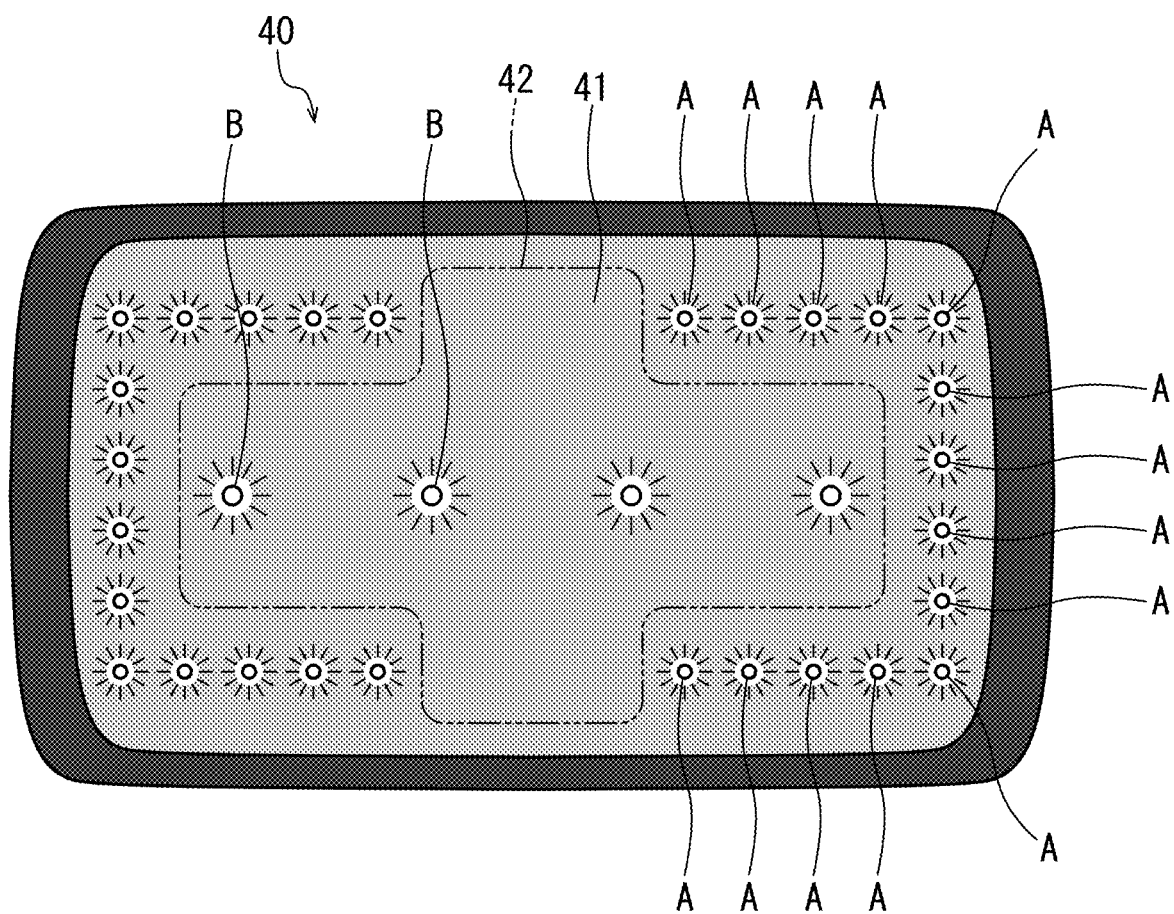
FIG. 5 is a front view of the taillamp device when both the taillamp and brake lamp are illuminated.

FIG. 3 is a front view of the taillamp device 40. FIG. 4 is a front view of the taillamp device 40 in the state where the taillamp is illuminated. FIG. 5 is a front view of the taillamp device 40 when both the taillamp and brake lamp are illuminated.

The outline of the front view of the taillamp device 40 has an approximately rectangle having long sides and short sides. The taillamp device 40 has a structure where a substrate 42 mounting LED sources is secured to a housing-integrated reflector unit 43 (refer to FIG. 10) covered with an outer lens 41 formed of a red transparent resin etc. Light guide portions 41b having semicircular sections and projecting backward is formed to the back surface of the outer lens 41. The light guide portions 41b are formed as substantially U shapes to surround the right and left of the cross-shaped substrate 42 in the vehicle width direction. A flange 41a that contacts the outer peripheral edge of the reflector unit 43 is formed to the outer peripheral edge of the outer lens 41.

Referring to FIG. 4, the taillamp device 40 of the present invention has multiple light-emitting portions A linearly arranged to surround the right and left of the substrate 42 in the vehicle width direction and to form substantially U-shaped light-emitting surfaces when only the taillamp is illuminated. At that time, each light-emitting portion A appears to have an LED light source. That is, the taillamp appears to emit light using twenty eight LED light sources in the example of this figure, but actually using four LED light sources to achieve such an appearance. In contrast, the light-emitting portions A emit light to emphasize the shape of the cross-shaped substrate 42 and to thus obtain a novel appearance.

Referring to FIG. 5, when both the taillamp and brake lamp are illuminated, four light-emitting portions B are located in a row, and the whole of the taillamp device 40 functions as a light-emitting surface. The light-emitting portions B include four LED light sources mounted to the surface of the substrate 42.

Figure 6:
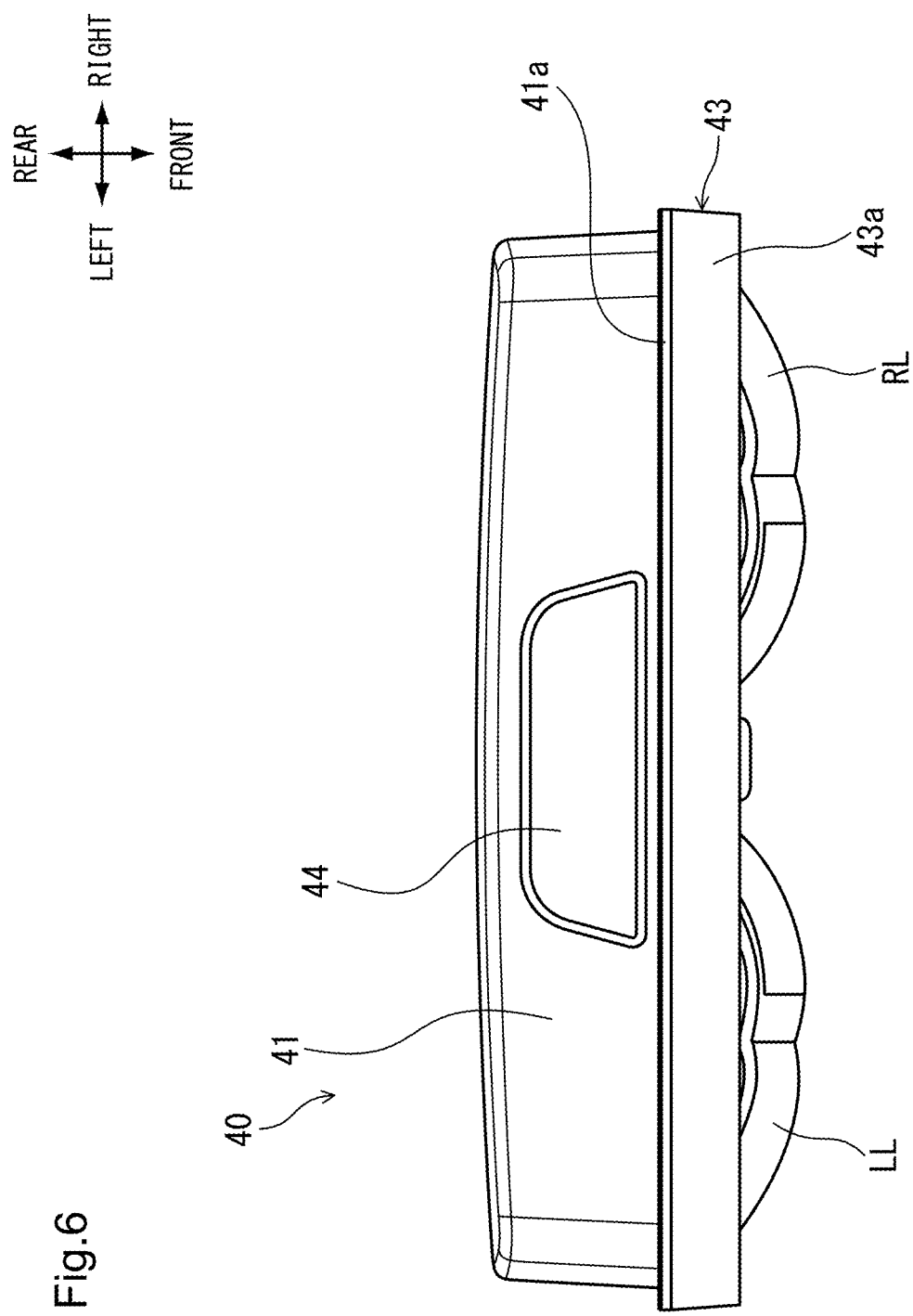
FIG. 6 is a bottom view of the taillamp device.
Figure 7:
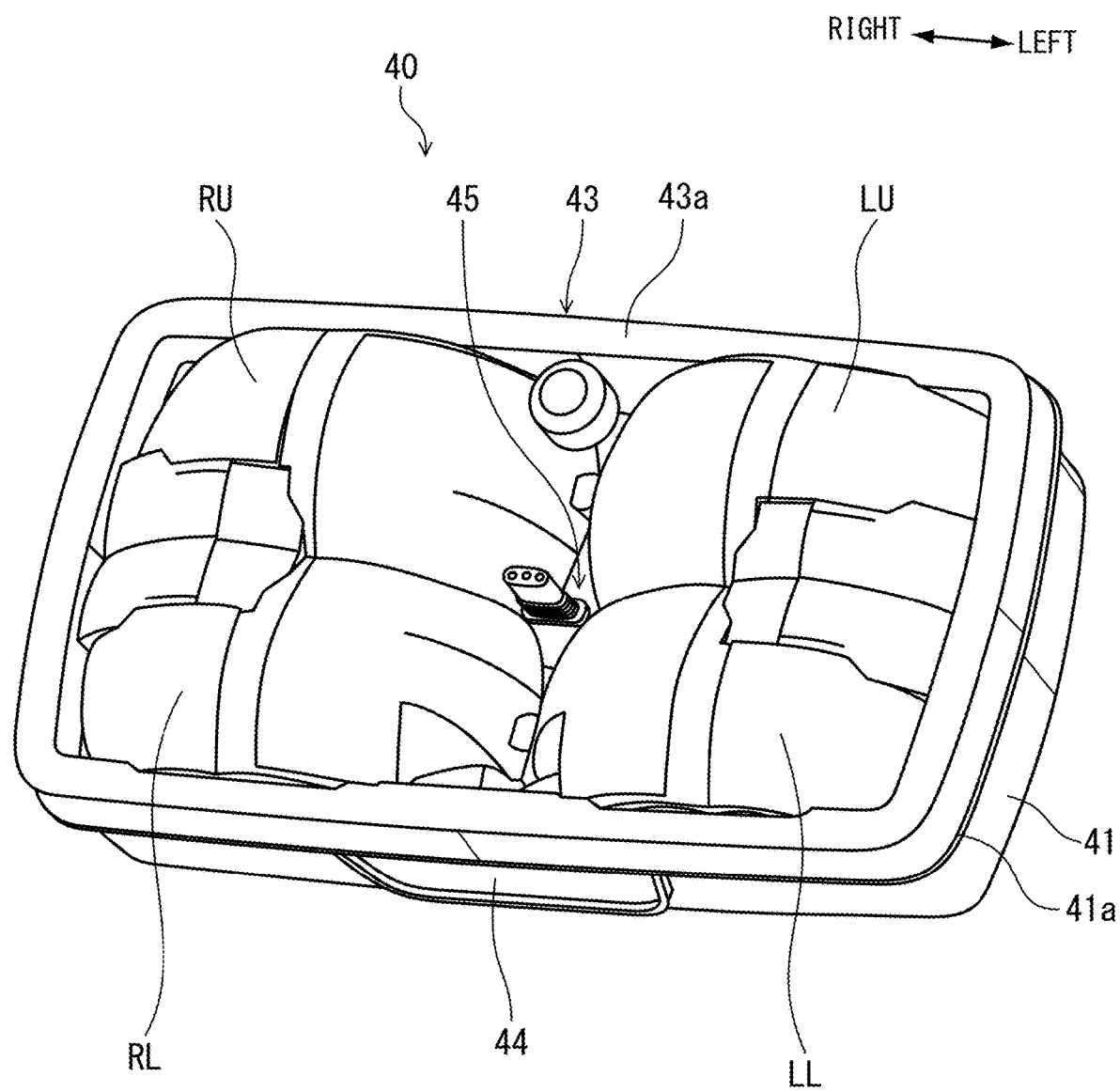
FIG. 7 is a perspective view of the taillamp device viewed from the back surface.

FIG. 6 is a bottom view of the taillamp device 40. FIG. 7 is a perspective view of the taillamp device 40 viewed from the back surface. A flange 41a of the outer lens 41 contacts a frame portion 43a of the reflector unit 43. The side wall portion of the outer lens 41 rises from the flange 41a rearward of the vehicle body. A license plate lens 44 is formed to the side wall toward the vehicle lower side to irradiate the license plate 31. The license plate lens 44, formed of, e.g., white transparent resin, is insert molded to the outer lens 41.

The bottom portions of four reflector portions LL, RL, LU, and RU bulge frontward of the vehicle body relative to the frame portion 43a of the reflector unit 43. The reflector unit 43 includes the upper left reflector portion LU, upper right reflector portion RU, lower left reflector portion LL, and lower right reflector portion RL. Between the reflector portions RU and RL on the right side and the reflector portions LU and LL on the left side, a partition portion 45 extends in the up-and-down direction and rises toward the vehicle-body rear side.

Figure 8:
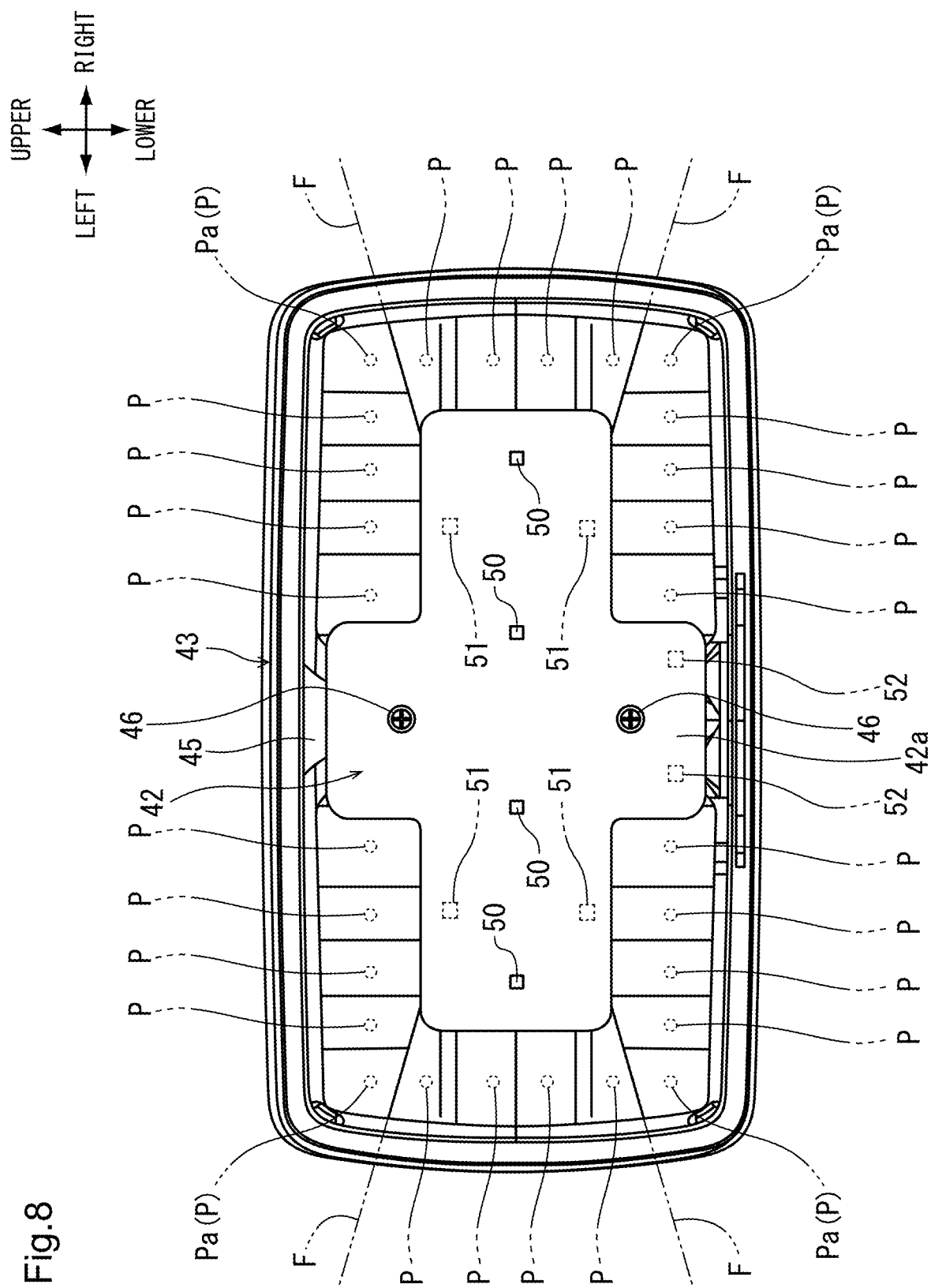
FIG. 8 is a front view when the outer lens of the taillamp device is removed.

FIG. 8 is a front view when the outer lens 41 of the taillamp device 40 is removed. The cross-shaped substrate 42 is secured to the vehicle-body rear end surface of the partition portion 45 by fastening members 46. Four brake lamp LEDs 50 as the second light sources that form light-emitting portions B of the brake lamp are mounted to the vehicle-body rear side surface (top surface) of the substrate 42 in a row at equal intervals. In contrast, taillamp LEDs 51 as light sources that form the light-emitting portions A of the taillamp are symmetrically mounted to the vehicle-body forward side surface (back surface) of the substrate 42. License light LEDs 52 as the third light sources are symmetrically mounted to the back side of a downward extending portion 42a formed to the lower portion of the substrate 42.

When reflecting the irradiation light of the taillamp LEDs 51 rearward of the vehicle body, the reflective surface of the reflector unit 43 makes multiple focuses P appear. The focuses P are positioned at the light-emitting portions A when the appearance of the taillamp device 40 is viewed from the vehicle-body rear.

Figure 9:
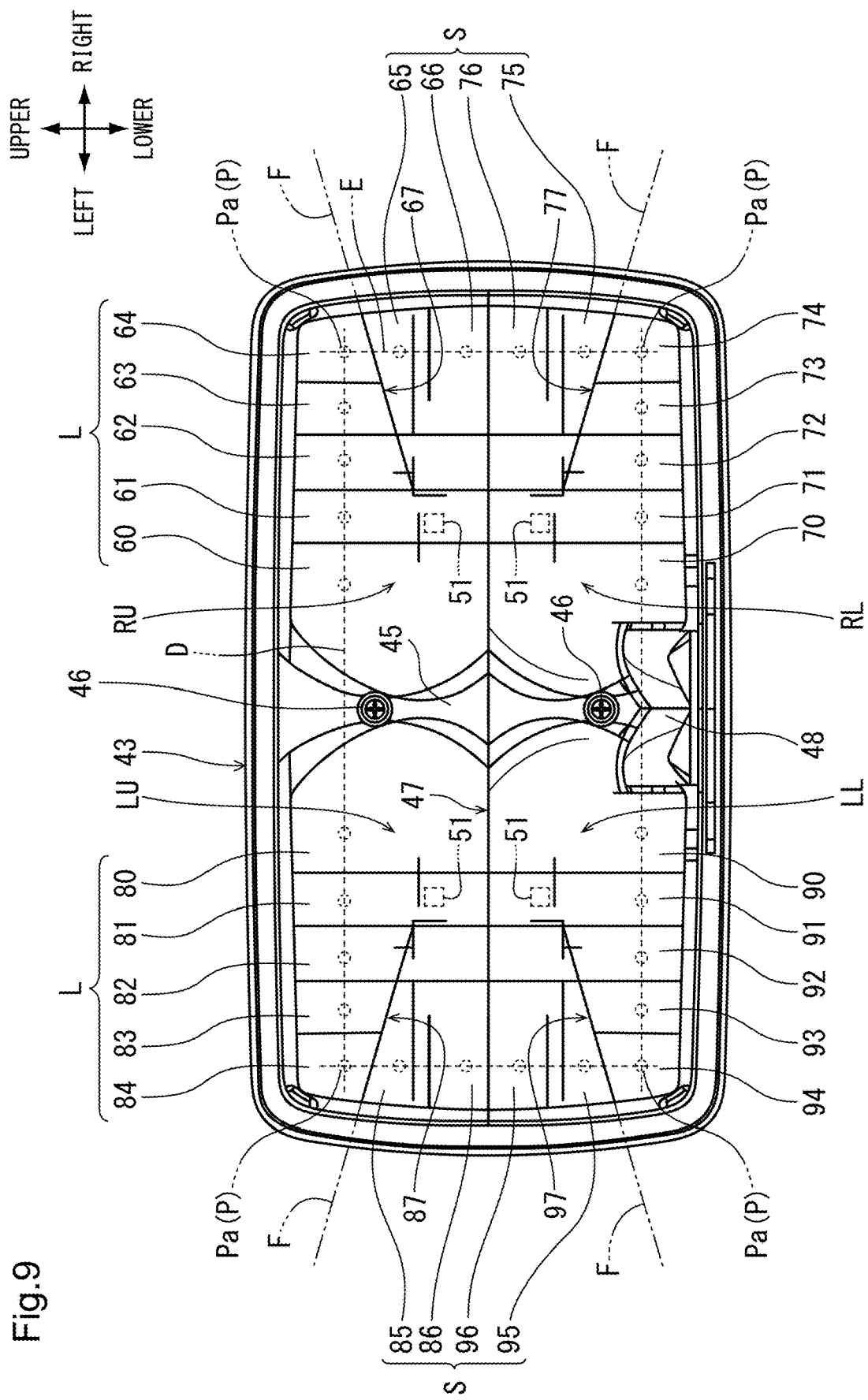
FIG. 9 is a front view illustrating a state where the substrate is removed from the state of FIG. 8.
Figure 10:
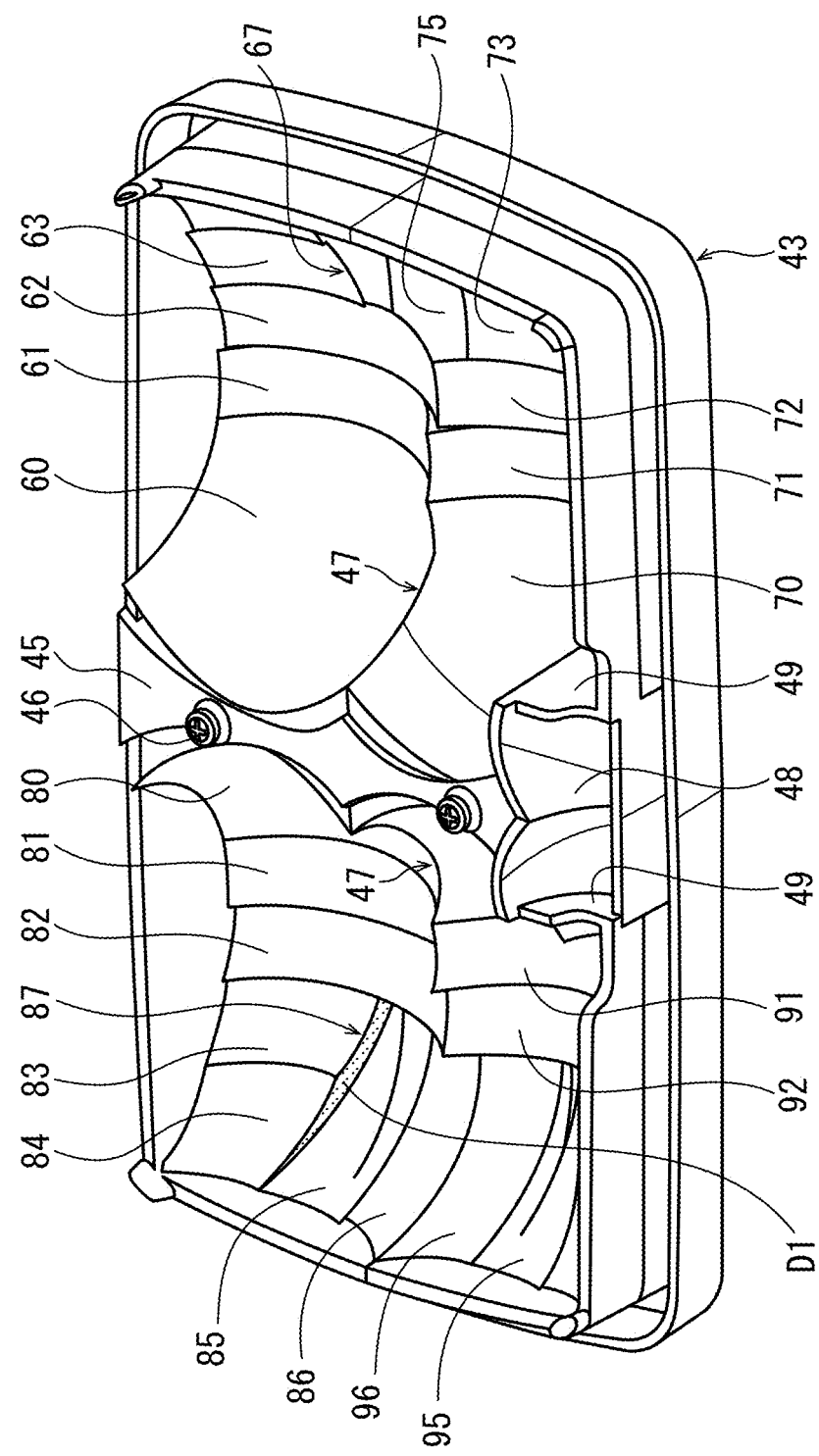
FIG. 10 is a perspective view of the reflector unit.

FIG. 9 is a front view illustrating a state where the substrate 42 is removed from the state of FIG. 8. FIG. 10 is a perspective view of the reflector unit 43. The upper left reflector portion LU has five long side reflectors L (80, 81, 82, 83, 84) contiguously arranged at the position toward the long side of the taillamp device 40 in the long side direction. The upper right reflector portion RU has five long side reflectors L (60, 61, 62, 63, 64) contiguously arranged at the position toward the long side of the taillamp device 40 in the long side direction. Similarly, the lower left reflector portion LL has five long side reflectors L (90, 91, 92, 93, 94), and the lower right reflector portion RL has five long side reflectors L (70, 71, 72, 73, 74).

In contrast, the upper left reflector portion LU has two short side reflectors S (85, 86) contiguously arranged at the position toward the short side of the taillamp device 40 in the short side direction. The upper right reflector portion RU has two short side reflectors S (65, 66) contiguously arranged at the position toward the short side of the taillamp device 40 in the short side direction. Similarly, the lower left reflector portion LL has two short side reflectors S (95, 96), and the lower right reflector portion RL has two short side reflectors S (75, 76). The long side reflectors L have different reflective surfaces in curvature and angle from those of the short side reflectors S.

Each of the four reflector portions of the reflector unit 43 entirely forms one ellipse reflector. This allows irradiation light of each taillamp LED 51 to be easily introduced outwardly in the vehicle width direction. Each taillamp LED 51 is disposed toward the center of the reflector portion. The reflector unit 43 can be formed using colored resin such as black one. The reflective surfaces can be formed using metal vapor deposition or plating processing.

The taillamp LEDs 51 are arranged toward the centers of the reflector portions LU, RU, LL, and RL in top view of the taillamp device 40, respectively. In the present invention, border lines 67, 77, 87, and 97 between the long side reflector L and short side reflector S are formed along inclined lines F inclined to extend from near the taillamp LEDs 51 relative to the long sides.

Thereby, the border lines 67, 77, 87, and 97 follow the irradiation directions of the irradiation light from the taillamp LEDs 51. The irradiation light easily reaches the long side reflector L and short side reflector S that adjoin each border line. Therefore, it becomes possible for not only the long side reflectors L but also short side reflectors S to emit light efficiently. This allows the light-emitting area along the short sides of the taillamp device 40 to be expanded using a single light source.

The border lines 67, 77, 87, and 97 are produced by level differences D1 that make low the short side reflectors S by one step relative to the long side reflectors L. Thus, irradiation light easily reaches the short side reflectors S to achieve equalization with the reflected light by the long side reflectors L.

The long side reflectors L have the focuses P formed by irradiation light after reflection and aligned with horizontal lines D. In contrast, the short side reflectors S have the focuses P formed by irradiation light after reflection and aligned with vertical lines E. Corner focuses Pa formed by vehicle width direction outermost portions 64, 74, 84, and 94 of the long side reflectors L are located on the extension of the vertical lines E.

Thereby, multiple focuses that make a large amount of light appear are disposed. The number of light sources can appear correspondingly to the number of the focuses even with four light sources. A unique appearance can be obtained using the four light sources where multiple light sources are disposed to the left and right portions of the lamp body in substantially U shapes.

A license plate reflector 48 is formed to the lower portion of the vehicle width center of the taillamp device 40, that is, the lower portion of the partition portion 45. The license plate reflector 48 reflects the irradiation light of the license light LEDs 52 to the license plate lens 44. The license plate reflector 48 is covered with the downward extending portion 42a of the substrate 42 by securing the substrate 42 to the partition portion 45. Thus, while enhancing the irradiation light to the license plate 31 by using the two license light LEDs 52, the reflected light from the license plate reflector 48 can be prevented from leaking toward the outer lens 41. Light shielding walls 49 are formed to the ends of the license plate reflector 48 in the vehicle width direction. The light shielding walls 49 prevent irradiation light from leaking toward the long side reflectors L.

Figure 11:
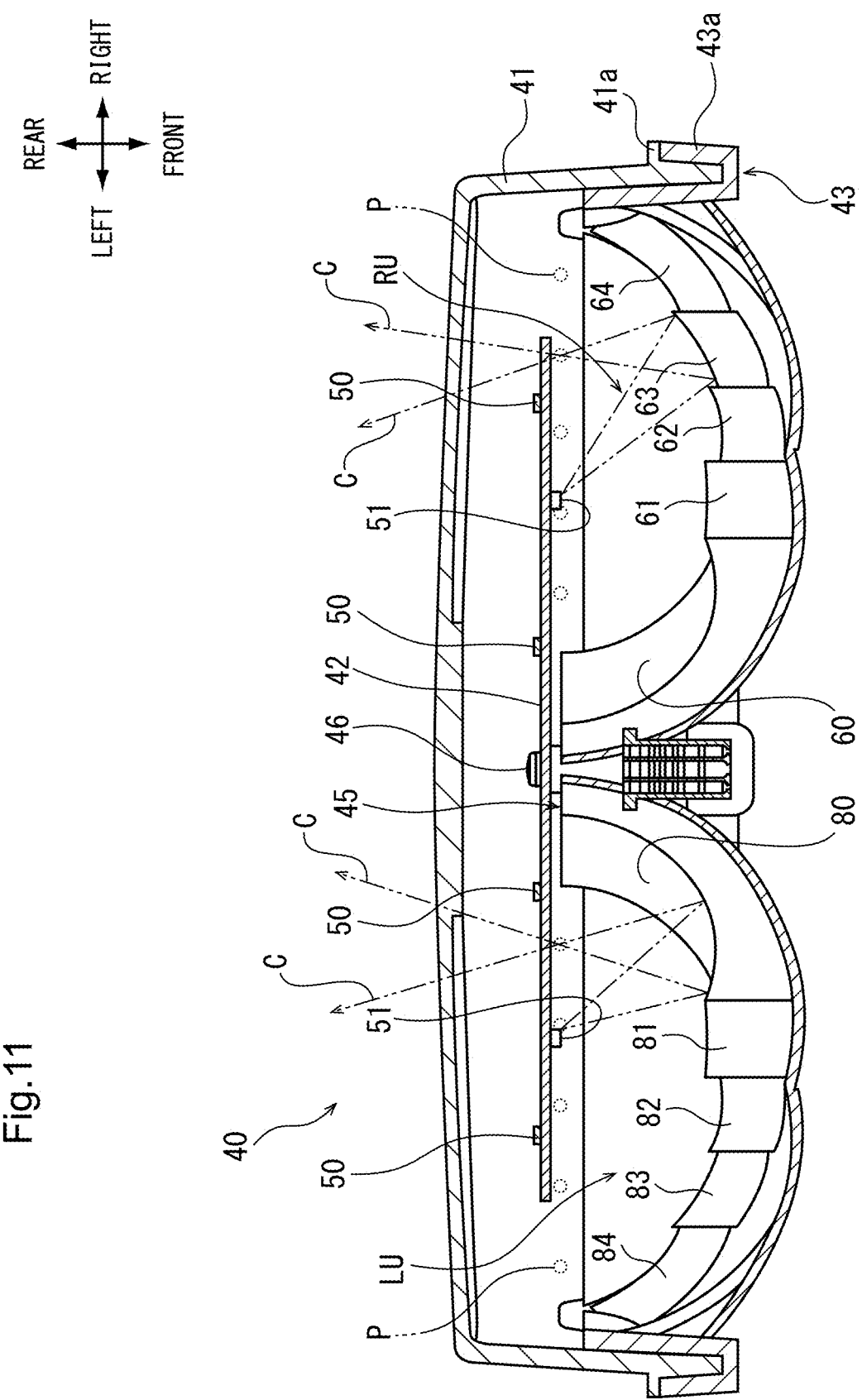
FIG. 11 is a sectional view taken along line XI-XI of FIG. 3.
Figure 12:
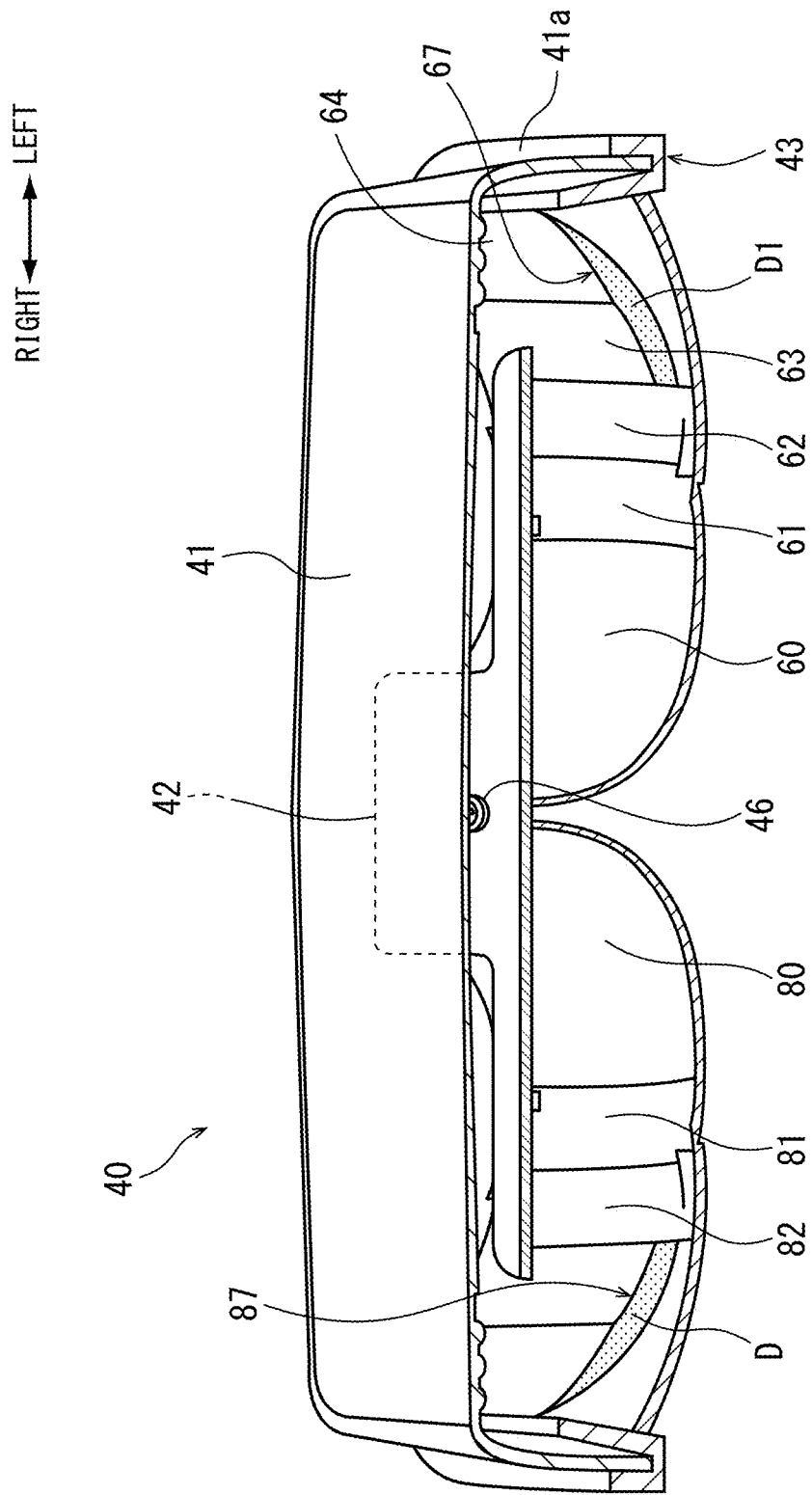
FIG. 12 is a perspective view taken along line XII-XII of FIG. 3.

FIG. 11 is a sectional view taken along line XI-XI of FIG. 3. FIG. 12 is a perspective view taken along line XII-XII of FIG. 3. FIG. 11 illustrates reflections of irradiation light C of taillamp LEDs 51 at the long side reflector 63 of the upper right reflector portion RU and at the long side reflector 80 of the upper left reflector portion LU.

According to the present embodiment, since the durability of the LED sources is high, the outer lens 41 and reflector unit 43 are fused and secured to each other. Thus, by eliminating the use of waterproof gaskets and fastening members, the number of parts and assembly steps can be reduced. By eliminating the use of the fastening members, it becomes unnecessary to provide a fastening boss toward the outer lens 41. The degree of freedom for design of the outer lens is also increased.

The substrate 42 which is a thin-plate member is substantially in parallel to the plane surface portion of the outer lens 41 to be secured to the partition portion 45 of the reflector unit 43. The partition portion 45 that partitions the irradiation range of the left and right reflectors at the center is also used to support the substrate 42. A separate support member is thus unnecessary. This allows reduction in the number of members and reduction in width and weight of the lamp device.

The irradiation light C of the taillamp LEDs 51 forms the focuses P when reflected by each reflector of the reflector unit 43 rearward of the vehicle body. The focuses P are set to the substantially same positions as the substrate 42 in the vehicle-body longitudinal direction (the vertical direction in the figure). Thus, light sources can appear at the focuses P when the taillamp device 40 is viewed from outside.

Figure 13:
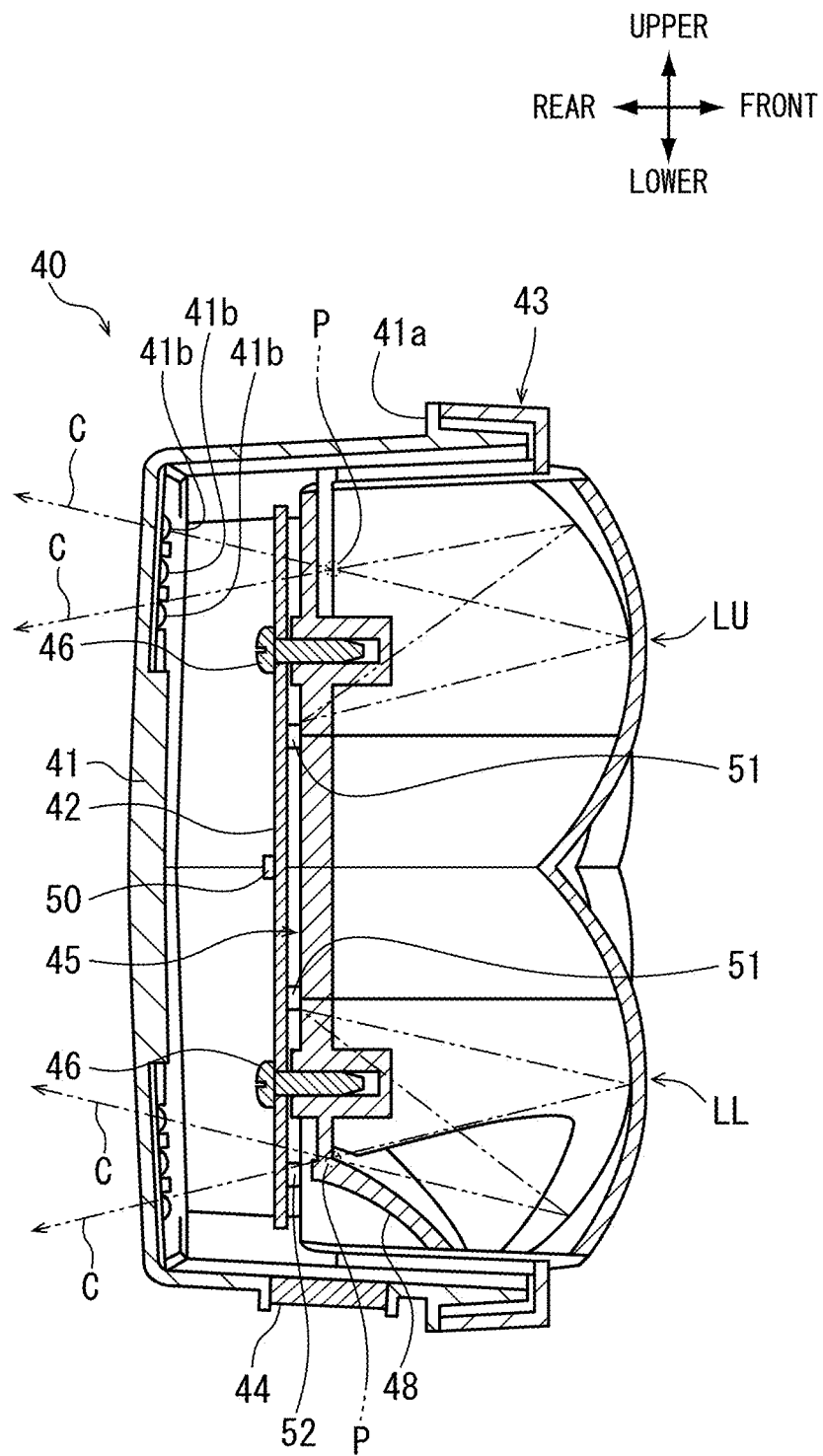
FIG. 13 is a sectional view taken along line XIII-XIII of FIG. 3.
Figure 14:
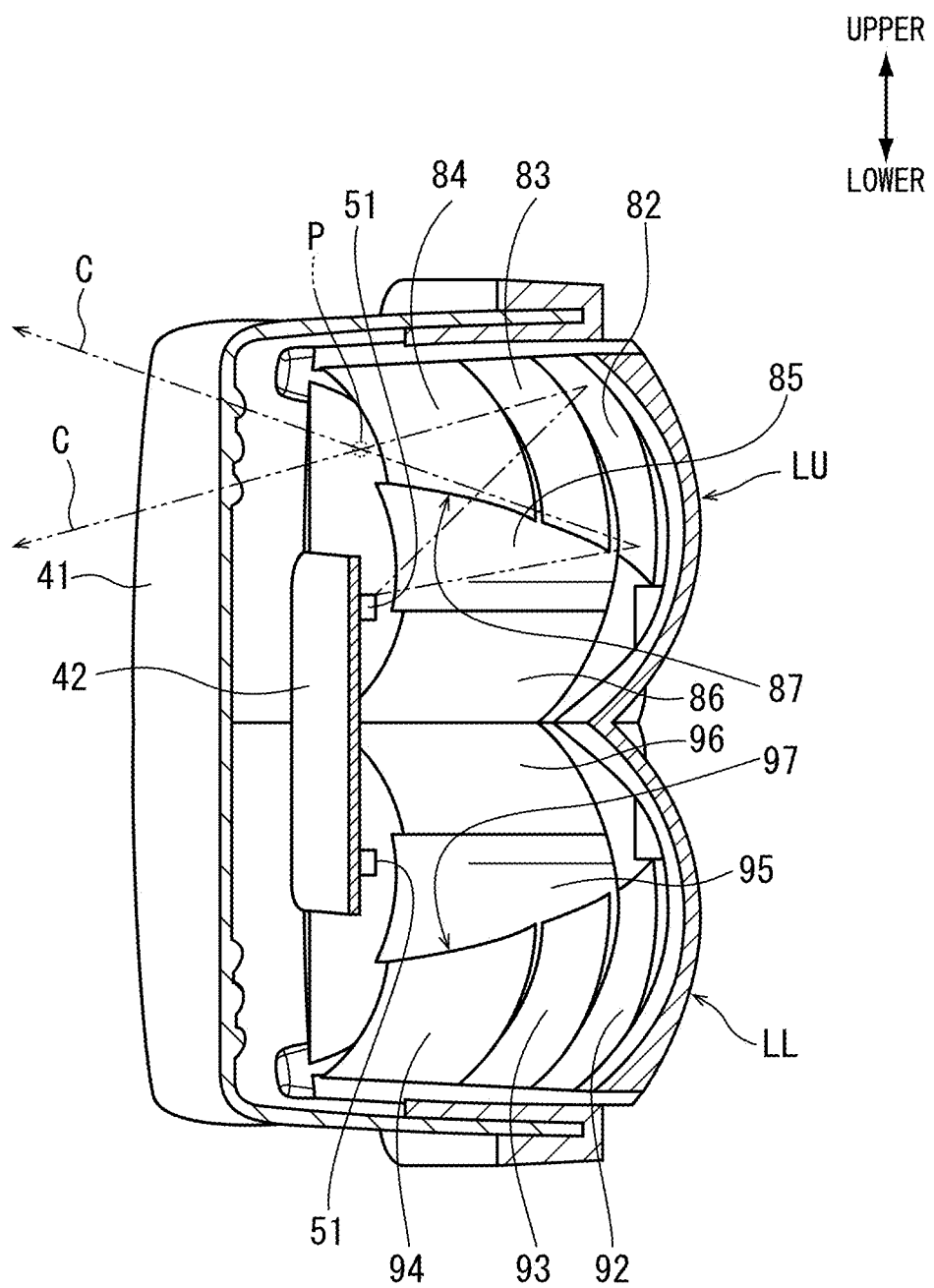
FIG. 14 is a perspective view taken along line XIV-XIV of FIG. 3.

FIG. 13 is a sectional view taken along line XIII-XIII of FIG. 3. FIG. 14 is a perspective view taken along line XIV-XIV of FIG. 3. FIGS. 13 and 14 illustrate reflection of the irradiation light C of the taillamp LEDs 51 from the long side reflector 63 of the upper left reflector part LU and from the long side reflector 82 of the upper left reflector part LU.

The irradiation light C after passing through the focuses P irradiates the vehicle-body rear side via the light guide portion 41b provided to the back surface of the outer lens 41. The light guide portion 41b can change the light emission mode of the taillamp to a different mode from the light emission mode of the stop lamp.

The type of the motorcycle, the type of the lamp device, the shape of the outer lens, the shapes of the reflector unit and reflector portions, the shape of the substrate and partition portion, etc. are not restricted to the above embodiment. Various modifications thereof are possible. For example, the reflector unit may include a housing portion connected to the outer lens and a reflector portion separately. The vehicular lamp device of the present invention is applicable not only to motorcycles but also to various vehicles such as saddle-ride type three- or four-wheeled vehicles.

EXPLANATIONS OF NUMERALS

1 . . . Motorcycle (vehicle)
40 . . . Lamp device
41 . . . Outer lens
42 . . . Substrate
43 . . . Reflector unit
45 . . . Partition portion
50 . . . Brake lamp LED (second light source)
51 . . . Taillamp LED (light source)
52 . . . License light LED (third light source)
64, 74, 84, 94 . . . Vehicle width outermost portion
67, 77, 87, 97 . . . Border line
A . . . Irradiation light
D1 . . . Level difference
D . . . Horizontal line
E . . . Vertical line
P . . . Focus
Pa . . . Corner focus
S (65, 66, 75, 76, 85, 86, 95, 96) . . . Short side reflector
L (60-64, 70-74, 80-84, 90-94) . . . Long side reflector
F . . . Inclined line
LU . . . Upper left reflector portion
RU . . . Upper right reflector portion
LL . . . Lower left reflector portion
RL . . . Lower right reflector portion

What is claimed is:

1. A vehicular lamp device comprises a horizontal rectangular shaped outline having long sides and short sides and that reflects irradiation light of light sources with a reflector unit for outward irradiation via an outer lens, wherein
the reflector unit includes at least one reflector portion, the at least one reflector portion includes:
a plurality of long side reflectors contiguously arranged in a long side direction at positions toward long sides of the lamp device; and
a plurality of short side reflectors contiguously arranged in a short side direction at positions toward short sides of the lamp device,
a light source provided to a position toward a center of the lamp device correspondingly to the at least one reflector portion in front view of the lamp device,
a border line between the long side reflector and the short side reflector is formed along an inclined line inclined to extend from near the light source toward the long side,
the reflector unit includes four of the reflector portions which are disposed adjacent each other and integrated with each other,
each of the four reflector portions includes one said light source, and
the border line is produced by a level difference that depresses the short side reflector by one step relative to the long side reflector.

2. The vehicular lamp device according to claim 1,
wherein the long side reflectors have focuses that are formed by irradiation light after reflection and that are disposed in a row on a horizontal line,
the short side reflectors have the focuses formed by the irradiation light after reflection and arranged in a row on a vertical line, and
corner focuses formed by vehicle width outermost portions of the long side reflectors are disposed on extensions of the vertical lines.

3. The vehicular lamp device according to claim 1, further comprising:
a substrate mounting the light sources; and
an outer lens that covers the reflector unit securing the substrate,
wherein the substrate is a thin-plate member that is substantially in parallel to a plane portion of the outer lens and that is secured to the reflector unit, and
the light sources are mounted to a surface of the substrate to face the reflector unit out of both surfaces of the substrate.

4. The vehicular lamp device according to, claim 1 wherein
the four reflector portions include an upper left reflector portion, an upper right reflector portion, a lower left reflector portion, and a lower right reflector portion,
a partition portion between left and right irradiation ranges is integrally arranged upright from between the upper left reflector portion and the upper right reflector portion to between the lower left reflector portion and the lower right reflector portion, and
the substrate is secured to a top of the partition portion.

5. The vehicular lamp device according to claim 3, further comprising second light sources are mounted to a surface of the substrate to face the outer lens out of both surfaces of the substrate.

6. The vehicular lamp device according to claim 3,
wherein the vehicular lamp device is a taillamp device configured to be disposed to a vehicle-body upper side of a license plate, and
the vehicular lamp device further comprises a license plate lens that is transparent to irradiation light of a third light source mounted to the substrate is provided to a surface of the outer lens to face a lower side of the vehicle body.

7. The vehicular lamp device according to claim 6,
wherein the third light source is mounted to a downward extending portion extending downward from the substrate in front view of the lamp device, and
the vehicular lamp device further comprises a license plate reflector provided to reflect irradiation light of the third light sources toward the license plate lens.

8. The vehicular lamp device according to claim 7,
including a plurality of said third light source, and
wherein the downward extending portion of the substrate covers the license plate reflector integrally formed to the reflector unit.

9. The vehicular lamp device according to claim 2, further comprising:
a substrate mounting the light sources; and
an outer lens that covers the reflector unit securing the substrate, wherein the substrate is a thin-plate member that is substantially in parallel to a plane portion of the outer lens and that is secured to the reflector unit, and the light sources are mounted to a surface of the substrate to face the reflector unit out of both surfaces of the substrate.

10. The vehicular lamp device according to claim 2, wherein the four reflector portions include an upper left reflector portion, an upper right reflector portion, a lower left reflector portion, and a lower right reflector portion, a partition portion between left and right irradiation ranges is integrally arranged upright from between the upper left reflector portion and the upper right reflector portion to between the lower left reflector portion and the lower right reflector portion, and the substrate is secured to a top of the partition portion.

11. The vehicular lamp device according to claim 3, wherein the four reflector portions include an upper left reflector portion, an upper right reflector portion, a lower left reflector portion, and a lower right reflector portion, a partition portion between left and right irradiation ranges is integrally arranged upright from between the upper left reflector portion and the upper right reflector portion to between the lower left reflector portion and the lower right reflector portion, and the substrate is secured to a top of the partition portion.

12. The vehicular lamp device according to claim 9, wherein the four reflector portions include an upper left reflector portion, an upper right reflector portion, a lower left reflector portion, and a lower right reflector portion, a partition portion between left and right irradiation ranges is integrally arranged upright from between the upper left reflector portion and the upper right reflector portion to between the lower left reflector portion and the lower right reflector portion, and the substrate is secured to a top of the partition portion.

* * * * *